US006266433B1

(12) United States Patent
Bolle et al.

(10) Patent No.: US 6,266,433 B1
(45) Date of Patent: Jul. 24, 2001

(54) SYSTEM AND METHOD FOR DETERMINING RIDGE COUNTS IN FINGERPRINT IMAGE PROCESSING

(75) Inventors: Rudolf Maarten Bolle, Bedford Hills, NY (US); Scott Eric Colville, Madison, WI (US); Sharathchandra U. Pankanti, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,109

(22) Filed: Apr. 29, 1999

Related U.S. Application Data

(63) Continuation of application No. 08/837,069, filed on Apr. 11, 1997
(60) Provisional application No. 60/032,713, filed on Dec. 13, 1996.

(51) Int. Cl.[7] ....................................... G06K 9/00
(52) U.S. Cl. ..................... 382/125; 382/124; 382/173; 382/194; 356/71
(58) Field of Search .................................. 382/124, 125, 382/173, 194; 356/71

(56) References Cited

U.S. PATENT DOCUMENTS

| | | | |
|---|---|---|---|
| 4,151,512 | 4/1979 | Riganati et al. | 382/125 |
| 4,310,827 | 1/1982 | Asai | 382/125 |
| 4,817,183 | 3/1989 | Sparrow | 382/125 |
| 4,947,442 | 8/1990 | Tanaka et al. | 382/125 |
| 5,054,090 | 10/1991 | Knight et al. | 383/127 |
| 5,105,467 | 4/1992 | Kim et al. | 382/125 |
| 5,140,642 | 8/1992 | Hsu et al. | 382/124 |
| 5,509,083 | 4/1996 | Abtahi et al. | 382/124 |
| 5,524,161 * | 6/1996 | Omori et al. | 382/125 |
| 5,613,014 | 3/1997 | Eshera et al. | 382/124 |
| 5,717,786 | 2/1998 | Kamei | 382/204 |

OTHER PUBLICATIONS

T. Ruggles et al., "Automated Fingerprint Identification Systems, I. North American Morpho System", Advances in Fingerprint Technology, pp. 212–226, CRC Press, Inc., 1994.

N.K. Ratha et al., "Adaptive Flow Orientation–Based Feature Extraction in Fingerprint Images", Pattern Recognition, vol. 28, No. 11, pp. 1657–1672, 1995.

* cited by examiner

*Primary Examiner*—Matthew C. Bella
*Assistant Examiner*—Sheela Chawan
(74) *Attorney, Agent, or Firm*—Louis J. Percello; Perman & Green, LLP

(57) ABSTRACT

A computer based image processing system uses an extraction process to include a pressure invariant feature for measuring distances between minutiae. The feature extraction process identifies one or more of the following features of the fingerprint: an orthogonal image contrast, a parallel image contrast, and a feature confidence. A ridge counter process, executing on the computer system, determines the number of ridges (ridge count) running across two given points and further qualifies (invalidates) this count if the confidence value of the pixels in the region adjoining the region is not reliable. The ridge count feature between minutiae is used for determining reliable features when matching fingerprints.

7 Claims, 10 Drawing Sheets

SYSTEM AND METHOD FOR DETERMINING RIDGE COUNTS IN FINGERPRINT IMAGE PROCESSING

The present application is a continuation of 08/837,069 filed Apr. 11, 1997 and claims priority to co-pending U.S. provisional application 60/032,713 filed Dec. 13, 1996.

FIELD OF THE INVENTION

This invention relates to the field of image processing. More specifically, the invention relates to a system and method for processing fingerprint images.

BACKGROUND OF THE INVENTION

There exist systems for accomplishing automatic authentication or identification of a person using his/her fingerprint. A fingerprint of a person comprises a distinctive and unique ridge pattern structure. For authentication or identification purposes, this ridge pattern structure can be characterized by endings and bifurcations of the individual ridges. These features are popularly known as minutiae.

An example fingerprint is shown in FIG. 1A. The minutiae for the fingerprint shown in FIG. 1A are shown in FIG. 1B as being enclosed by "boxes." For example, box 101B shows a bifurcation minutiae of a bifurcated ridge 101A and box 103B shows a ridge ending minutiae of ridge 103A. Note that minutiae on the ridges in fingerprints have directions (also called orientations) 105 associated with them. The direction of a minutiae at a ridge end 103B is the direction in which the end of the ridge points. The direction of a bifurcation minutiae 101B is the direction in which the bifurcated ridge points. Minutiae also have locations which are the positions, with respect to some coordinate system, of the minutiae on the fingerprint.

One of the prevalent methods of fingerprint authentication and identification methods is based on minutiae features. These systems need to process the fingerprint images to obtain accurate and reliable minutiae features to effectively determine the identity of a person.

FIG. 2 is a flow chart showing the steps generally performed by a typical prior art system 200.

In step 210, the image is acquired. This acquisition of the image could either be through a CCD camera and framegrabber interface or through a document scanner communicating with the primary computing equipment.

Once the image is acquired into the computer memory or disk, relevant minutiae features are extracted (220). Not all of the features thus extracted are reliable; some of the unreliable features are optionally edited or pruned (step 230), e.g., by manual editing. The resultant reliable features are used for matching the fingerprint images (step 240).

In semi-automatic systems, the unreliable features could be manually pruned by a human expert visually inspecting the extracted features before the minutiae are used for matching (step 240). The following reference mentions such a manual pruning system incorporated into an automatic fingerprint identification system:

Advances in Fingerprint Technology,
Edited by Henry C. Lee, R. E. Gaensslen,
Published by CRC press, Ann Arbor,
Chapter on Automated Fingerprint Identification Systems,
I. North American Morpho Systems,
Section on Fingerprint Processing Functions.
This reference is herein incorporated by reference in its entirety.

The fingerprint feature extraction 220, pruning 230, and matching system 240 constitute the primary backbone 250 of a typical minutiae-based automatic fingerprint identification systems (AFIS). The matching results are typically verified by a human expert (step 260). The verification may also be performed automatically. The following reference describes examples of the state of the prior art:

Nalini K. Ratha and Shaoyun Chen and Anil K. Jain,
Adaptive flow orientation based texture extraction in fingerprint images,
Pattern Recognition,
vol. 28, no. 11, pp. 1657–1672, November, 1995.
This reference is herein incorporated by reference in its entirety.

FIG. 3 is a flow chart showing the prior art steps performed by a feature extraction process 220 that are similar to some of the feature extraction methods proposed by Ratha, Jain, and Chen in the article incorporated above.

It is often not desirable to directly use the input fingerprint image for feature extraction. The fingerprint image might need an enhancement or preprocessing before one could further extract minutiae. Typically, a smoothing process is employed to reduce the pixel-wise noise (step 305).

After the preprocessing stages, prior art systems find the directions of the ridge flow (step 310). The next important step in the processing is finding the exact location of the finger in the image. To accomplish this a process referred to as the foreground/background segmentation (step 315) separates the finger part of the image from the background part of the image. Once the finger part is localized, i.e., segmented to define its location, the next step is to extract the ridges from the fingerprint image (step 320). The ridges thus extracted are thick and might contain some noisy artifacts which do not correspond to any meaningful structures on the finger. These small structures, i.e., the noisy artifacts, can be safely removed and longer structures are smoothed (step 325). The longer structures are thinned to one-pixel width and then processed to remove any other artifacts using morphological operators (step 330). The locations and orientations of ridge endings and bifurcations are then extracted from the thinned structures (step 335) to obtain the minutiae. In some systems, a "cleanup" or post-processing 340 is performed. Here, based on certain criteria, undesirable minutiae are removed.

STATEMENT OF PROBLEMS WITH THE PRIOR ART

Since the human skin is elastic, the image capture process might result in different distortions of the finger skin with each different capture of the fingerprint as it is being placed on the fingerprint capture station. This results in an identical pair of the features (say, minutiae) at different distances apart from each other in the different prints of the same finger captured at different times. Some prior art systems use Euclidean (geometric) metric features for fingerprint image processing. Such systems cannot identify two differently distorted prints of the same fingers as identical.

FIG. 4 is a prior art drawing of two typical prints 410 (FIG. 4A) and 420 (FIG. 4B) of the same finger. The fingerprints were captured with shear in different directions. As the fingerprint itself is distorted, the minutiae-based features located on the fingers are differently displaced from their original position. Consequently, it is difficult to match these prints based on a matching strategy using features which are purely Euclidean (geometric), e.g., distance between minutiae. For instance, it is typical to have fingerprint features displaced 5–20% from their original position due to varying magnitude and direction of pressure of the finger on the glass plate (in case of livescan fingerprint process) and on paper (in case of inked fingerprints). To illustrate, the distance between minutiae 401 and 402 in FIG. 4A is d1, whereas the distance between these minutiae (401, 402) in FIG. 4B, the same fingerprint with a different shear, is d2, a different difference. When the distance between the same minutiae differ in different images of the same fingerprint, it is difficult to determine that these images should be matched.

OBJECTS OF THE INVENTION

An object of this invention is an improved fingerprint image processing system.

An object of this invention is to improve the accuracy and reliability of a fingerprint image matching system by automating a metric which is less sensitive to the pressure and shear variance in fingerprint images.

SUMMARY OF THE INVENTION

The invention provides an automatic pressure/shear invariant metric of measuring the distances of features on the fingerprint. This metric uses ridge counts to measure these distances. A ridge count between any two points on the fingerprint is defined as the number of ridges running between the two points on the fingerprint. Given two points in the fingerprint image, the present ridge count process determines the length of the line (or bar) joining the points in terms of number of ridge distances, i.e., the number of times the lines crosses the ridges. Since the ridge count is invariant to the elastic distortions of the finger, i.e., distances measured in ridge counts will be the same for any elastic distortion of the fingerprint image. In a preferred embodiment, the process invalidates the ridge count between two points if the adjoining line is passing through noisy (invalid) fingerprint regions.

BRIEF DESCRIPTION OF THE DRAWINGS

The foregoing and other objects, aspects and advantages will be better understood from the following detailed description of preferred embodiments of the invention with reference to the drawings that include the following:

FIG. 7, comprising

DETAILED DESCRIPTION OF THE INVENTION

Figure 5:
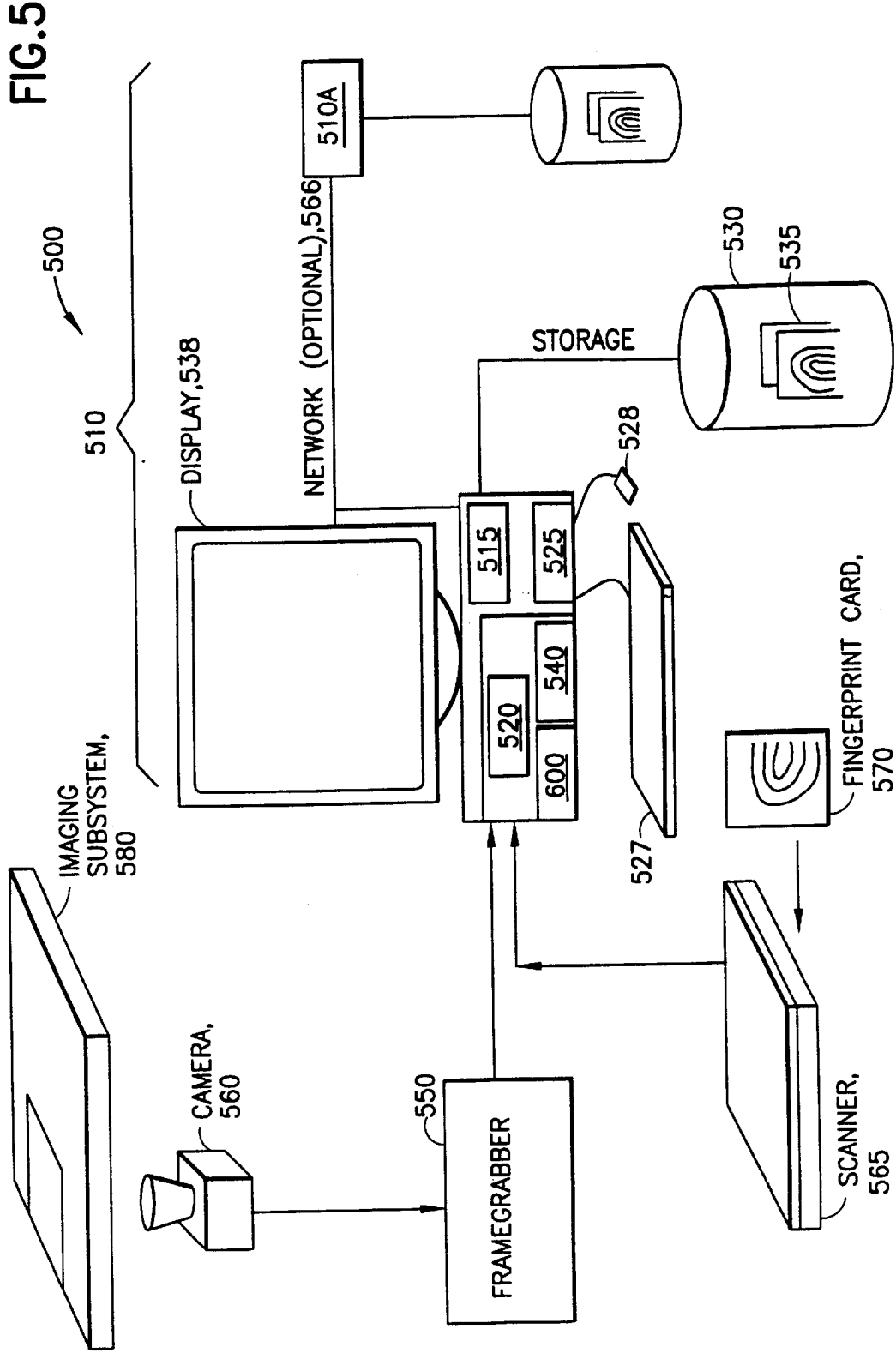
FIG. 5 is a block diagram of one preferred embodiment of the present system.

Referring now to the drawings, and more particularly to FIG. 5, there is shown the block diagram representation of a general computer hardware environment that is used as the image processing system 500. This computer 510 may be one of International Business Machines Corporation (IBM) Personal System/2 (PS/2) family of Personal Computers, a RISC System/6000, or Power Parallel System (SP/x), or equivalent The system 500 includes one or more central processing units (CPU) 515, which may conform to any general computer architecture (e.g., Intel or a reduced instruction set microprocessor.) The CPU 515 is attached to a system bus (not shown) to which are attached a read/write and/or random access memory (RAM) 520 that can include one or more cache memories, a read only memory (ROM) 540, and an input/output adapter 525. The RAM 520 provides temporary storage for one or more application program processes 600 containing code and/or data while the ROM typically includes the basic input/output system (BIOS) code. A disk memory 530, e.g., Direct Access Storage Devices (DASDs), here represented by a hard disk drive 530, are also connected to the CPU by an appropriate adapter (not shown.) The hard disk drive 530 typically stores the computer's operating system (OS), such as IBM's OS/2 operating system, and various application programs, data, and/or databases. These databases include intermediate results and fingerprint image data 535. Typically, the input/output adapter 525 has attached to it a keyboard 527, a mouse 528, and/or other user interface devices (not shown).

The system 500 also can include a display 538, here represented as a cathode ray tube (CRT) display but which may be a liquid crystal display (LCD) or other suitable display and/or graphic user interface (GUI) 538. The display 538 is connected to the system bus via a display adapter.

The computer 510 is also interfaced with a framegrabber 550 and an image acquisition device, e.g., a camera 560 along with imaging subsystem to capture a livescan fingerprint image onto the computer memory/disk. Alternatively, the computer might be communicating with a document scanning device 565 that scans the fingerprint image from a document like an inked fingerprint card -570. Any other known means can be used to enter a fingerprint image to the memory 535, e.g., transmitting an image over a network 566 from other equivalent systems 510A.

The hardware for system 500 and equivalents of these systems are well known to those skilled in the art.

Personal System/2, PS/2, OS/2, RISC System/6000, Power Parallel System, SP/x, and IBM are trademarks of the International Business Machines Corporation.

Figure 1A:
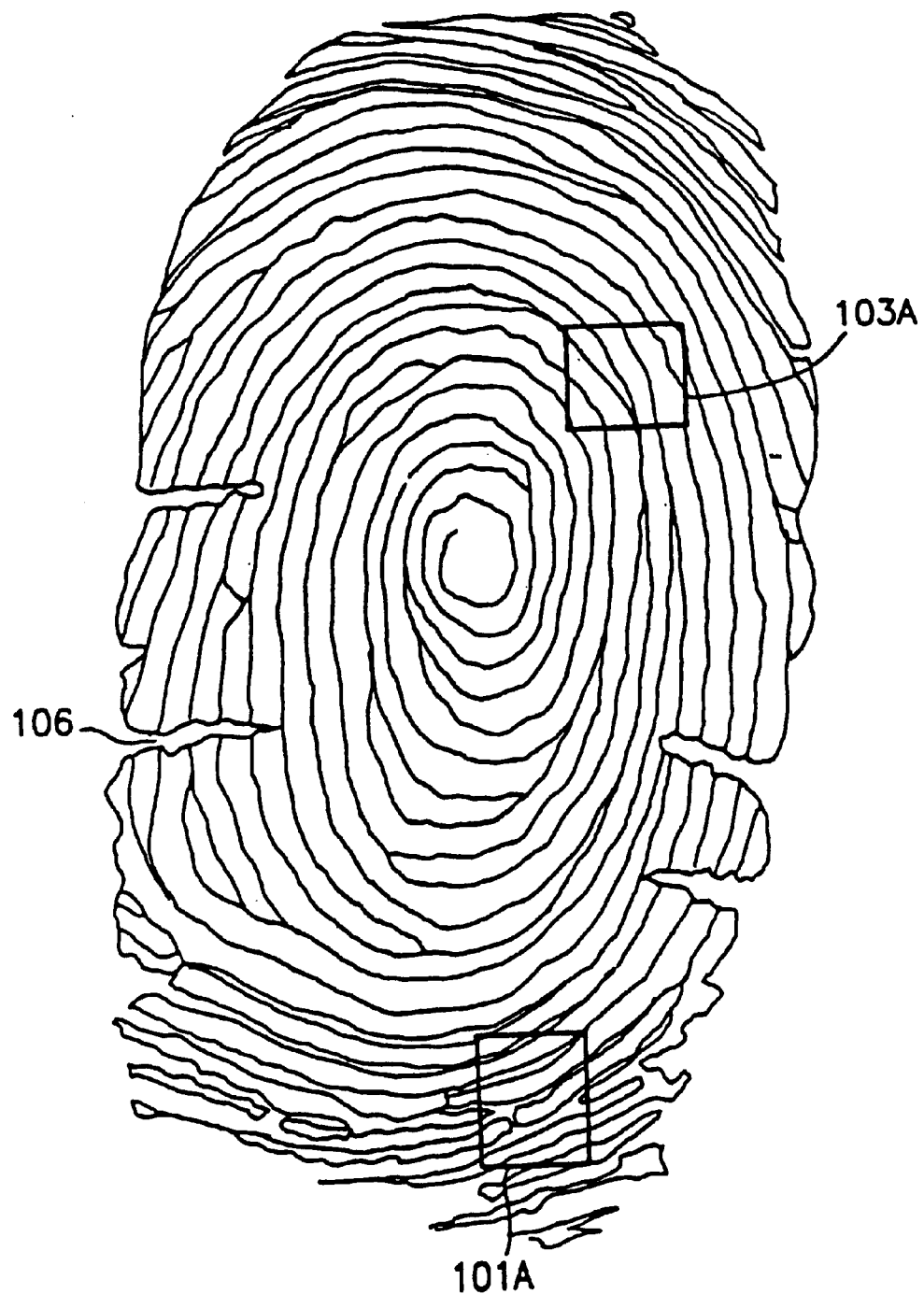
FIG. 1A is a prior art drawing of a typical fingerprint.
Figure 1B:
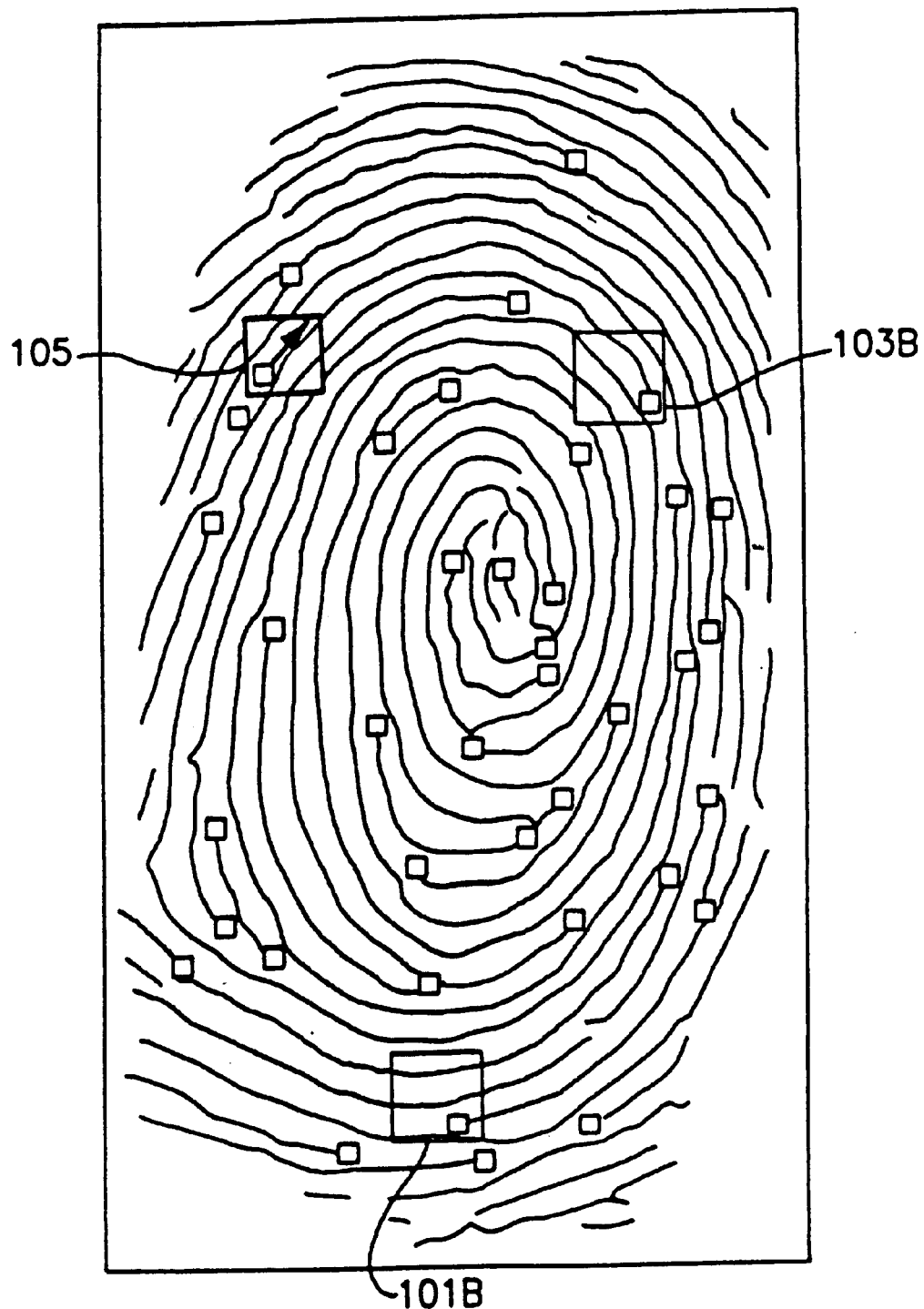
FIG. 1B is a prior art drawing showing minutiae of the figure print in FIG. 1A.
Figure 2:
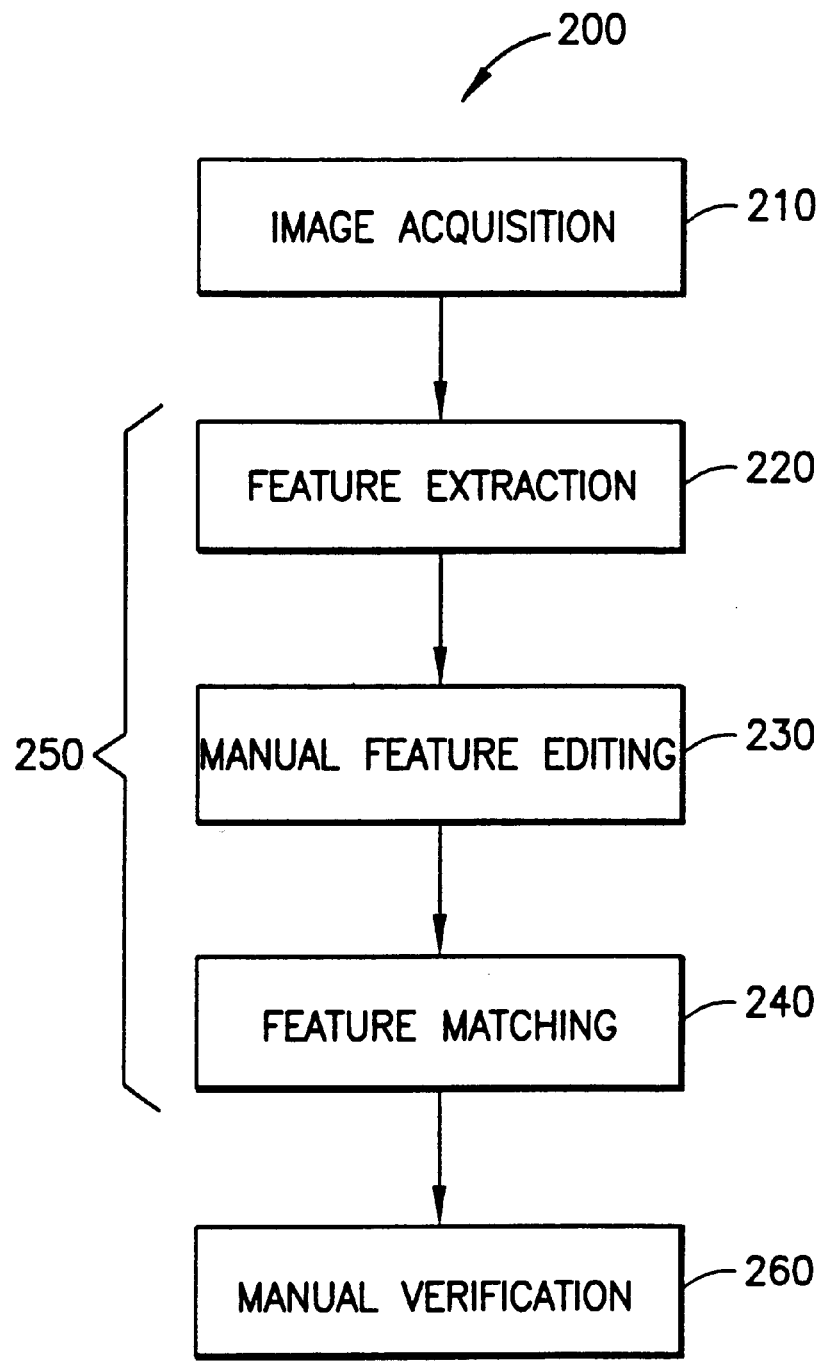
FIG. 2 is a flow chart showing the method steps performed by a typical prior art system.
Figure 6:
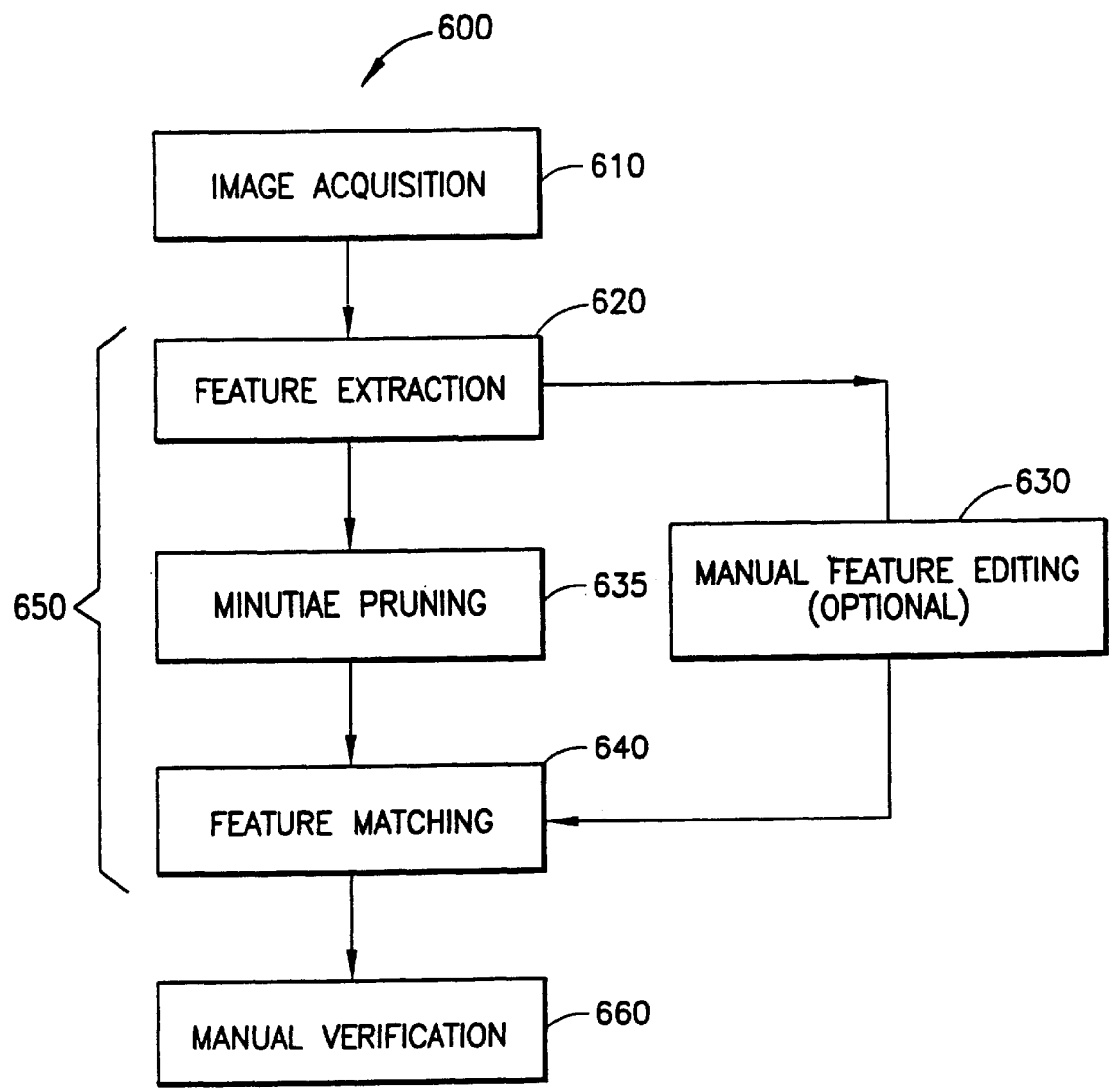
FIG. 6 is a flow chart showing the steps performed by an image extraction process of the present invention.

FIG. 6 is a flow chart showing the steps performed by a preferred automatic fingerprint identification system 600. In this embodiment 600, steps 610, 630, 660 correspond to the known prior art steps 210, 230, and 260 (FIG. 2), respectively. The feature extraction 620 and the feature matching 640 steps include novel functions that are described below in detail. Novel pruning processes 635 are described in detail in the patent application Ser. No. 08/823,637, filed Mar. 25, 1997, entitled "System and Method Using Minutiae Pruning for Fingerprint Image Processing", to Bolle et al. and which is herein incorporated by reference in its entirety.

The feature extraction step 620 identifies one or more of the following features of the fingerprint: average foreground brightness, foreground boundary, orthogonal image contrast, parallel image contrast, feature confidence, distance between two minutia, neighbor information, angle-distance between two minutia, angle-distance neighbor information, minutiae density, ridge length, ridge density, and wiggle factor. These features are also described in detail in above mentioned Patent Application entitled "System and Method Using Minutiae Pruning for Fingerprint Image Processing", to Bolle et al. Only computation of average foreground brightness, orthogonal image contrast, parallel image contrast, feature confidence will be described here. These quantities are used to define a novel determination of a ridge-count based distance measure.

Average foreground brightness is determined as follows. The area of the foreground region (region occupied by the finger in the fingerprint image) is obtained from foreground-background segmentation step 315. The average of intensities of the pixels of the original input fingerprint image over this foreground area is the average foreground brightness.

The distance between two point coordinates referred to in this document is the geometric or Euclidean distance and computation of geometric distance and the corresponding concept of length is apparent to those skilled in the art.

A geometric line segment is a concept comprising an infinite set of geometric points, each occupying zero area; the geometric line segment could be typically defined by slope, geometric length, a pre-specified Cartesian coordinate of a point belonging to the line segment with respect to its end points. The digital line segment corresponding to a geometric line segment is described by a set of pixels as determined by the discrete quantization scheme. Similarly, given a geometric point coordinate, the corresponding digital pixel is also determined by the discrete quantization scheme. These concepts of digital and geometric conversions are apparent to those skilled in the art.

Image contrast is determined by computing statistical variance of the intensities of a given set of pixels.

Figure 3:
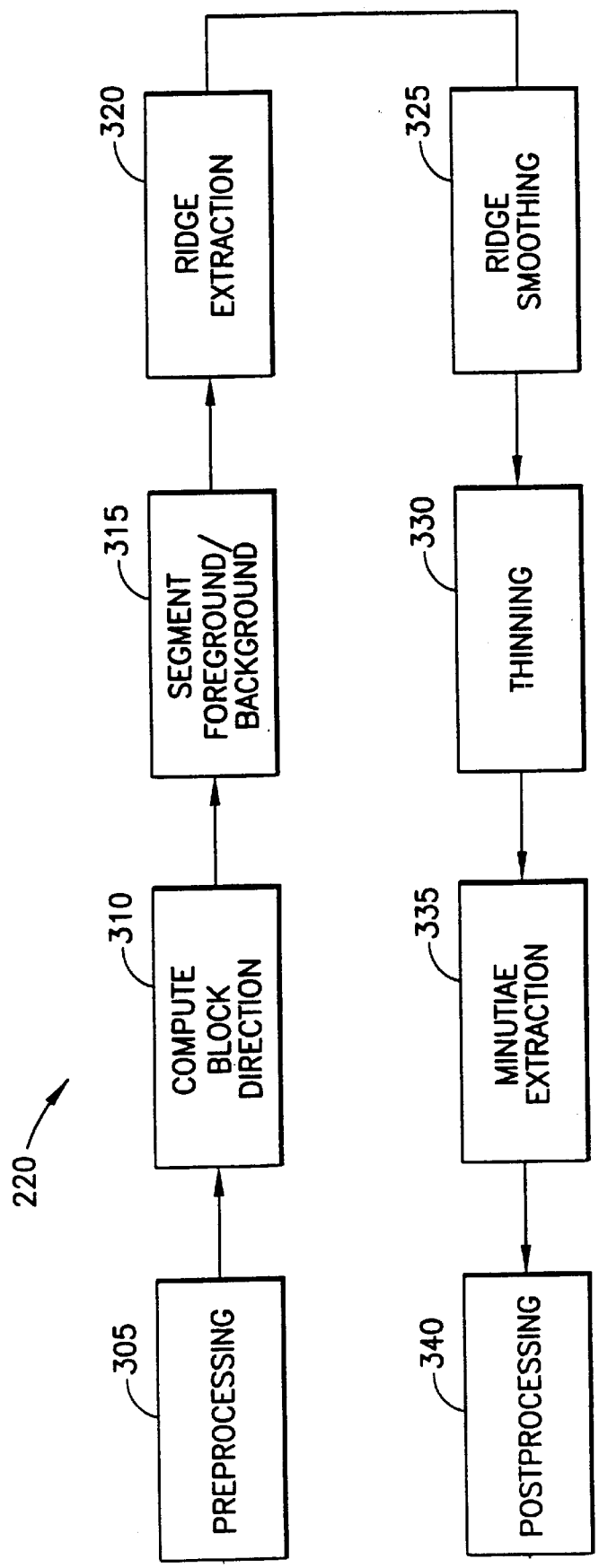
FIG. 3 is a flow chart showing the prior art steps performed by a prior art image extraction process.
Figure 4A:
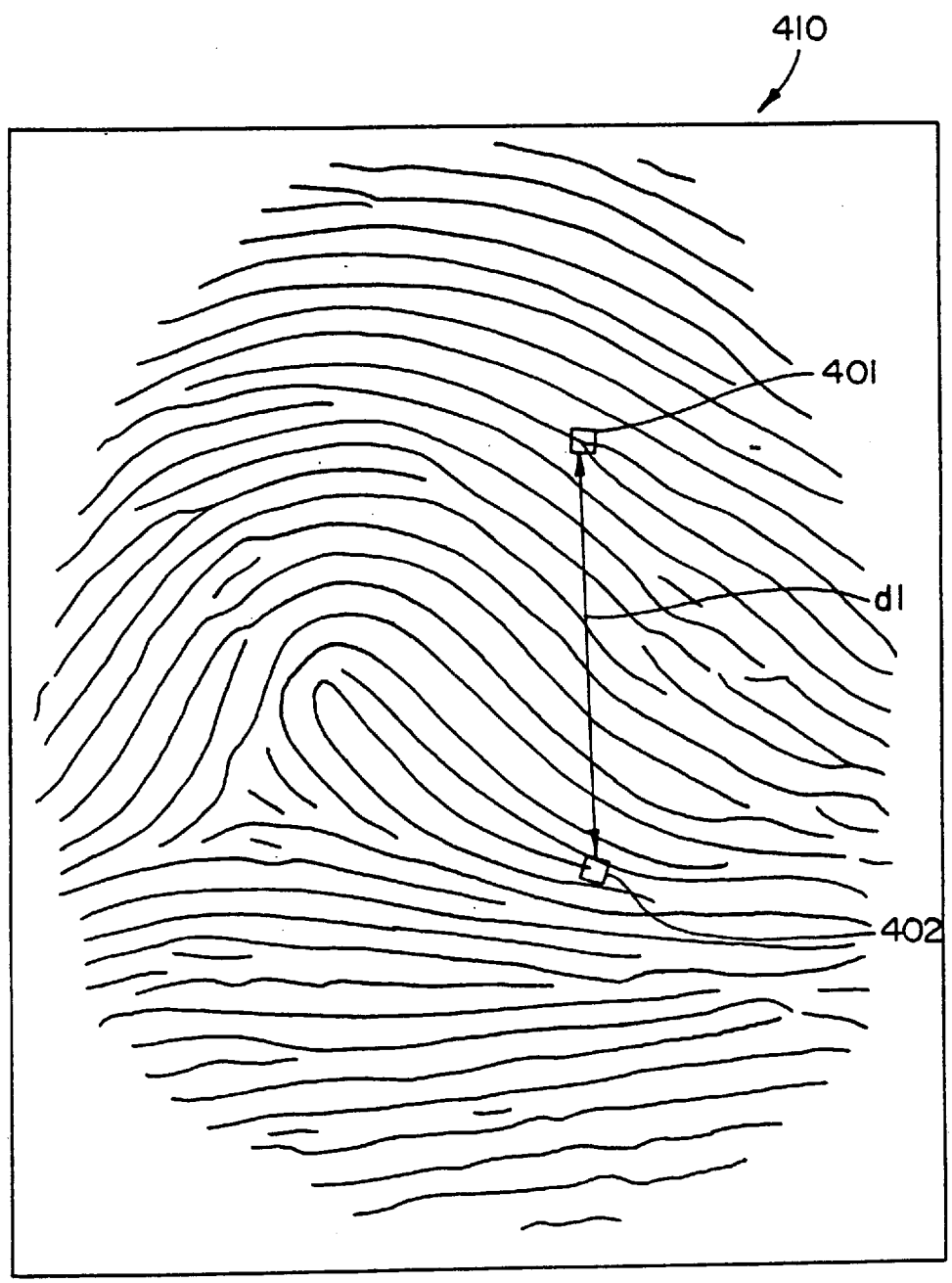
FIG. 4A is a drawing of a typical prior art fingerprint with the ridges extracted.
Figure 4B:
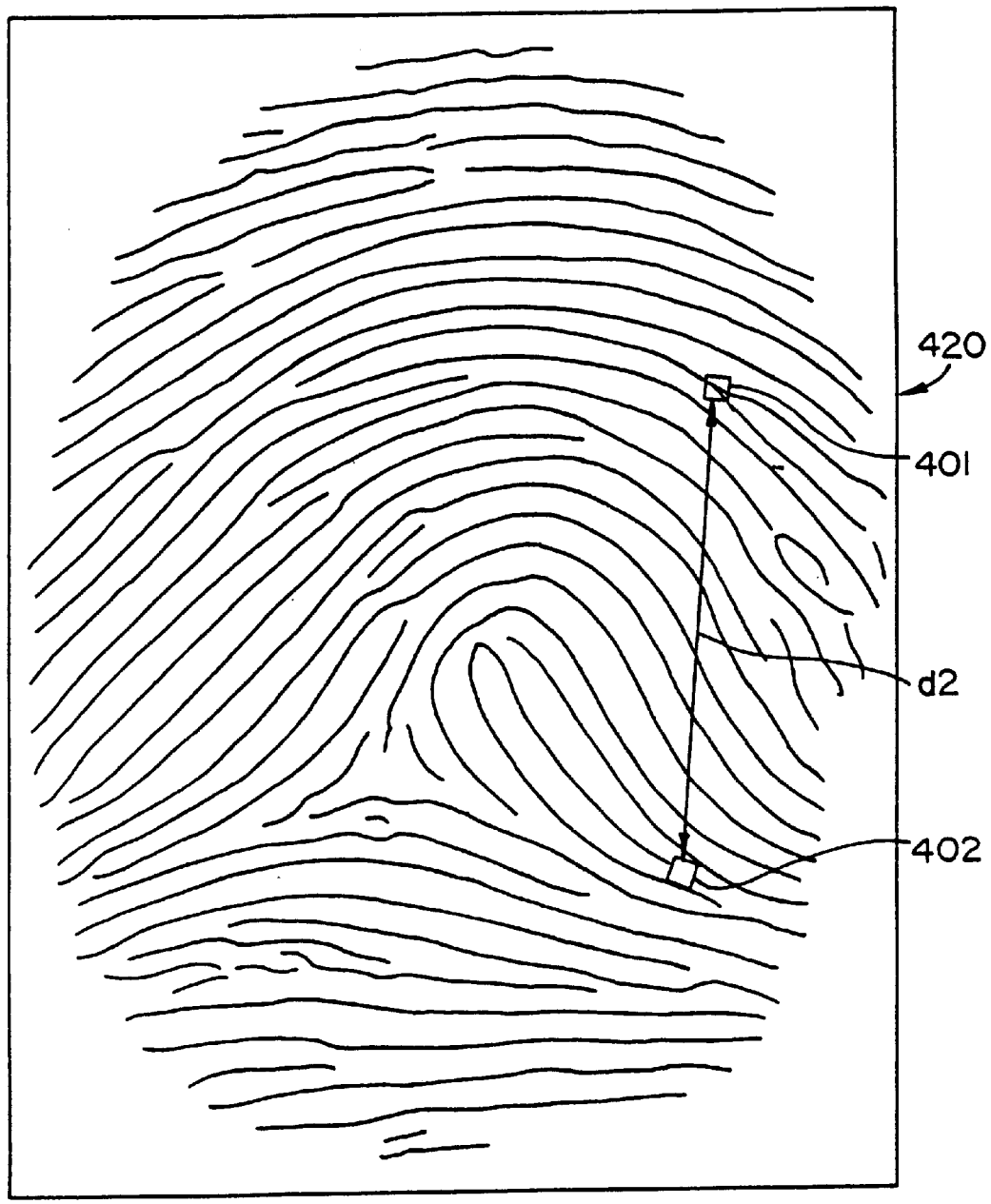
FIG. 4B is a drawing of the extracted ridges of a fingerprint of the same finger with shear pressure applied during acquisition.

"Orthogonal image contrast" at a given pixel is defined as the image contrast of the pixels selected along the direction orthogonal to the ridge direction at that pixel. In a preferred embodiment, orthogonal image contrast at a given pixel is computed as follows: a pre-specified number (n) of pixels are selected along the line segment centered at the given pixel in the image and oriented in the direction orthogonal to the block direction at that pixel. Here the block direction is determined by prior art techniques. See step 310 in FIG. 3. Selecting n/2 pixels on a line segment on either side of the given pixel, where the line segment is orthogonal to the block direction and passes through the given pixel is a well known technique. The orthogonal image contrast, for the given pixel, is the statistical variance of intensities of these n selected pixels. In a preferred embodiment, n is selected to be in the range of 6 to 16 pixels. In a more preferred embodiment, n=8 pixels.

"Parallel image contrast" at a given pixel is defined as the statistical variance of the intensities of the pixels selected along the block direction at that pixel. In a preferred embodiment, parallel image contrast at a given pixel is computed as follows: a pre-specified number (m) of pixels are selected along the line segment centered at the given pixel in the image and oriented in the direction parallel to the block direction at that given pixel. Here the block direction is again determined by prior art techniques. See step 310 in FIG. 3. Selecting m/2 pixels on the parallel line segment on either side of the given pixel is a well known technique. The parallel image contrast, for the given pixel, is the statistical variance of intensities of these m selected pixels. In a preferred embodiment, m is selected to be in the range of 6 to 16 pixels. In a more preferred embodiment, m=8 pixels.

In a preferred embodiment, the parallel and orthogonal contrast are determined during the feature extraction process 620 at only the block centers of the blocks and the contrast feature for all the pixels in a block are equated to contrast features at the block center pixel.

The idea underlying computation of a "feature confidence" is that a good fingerprint image region is characterized by large variation in the pixel brightness in the direction orthogonal to the ridge directions and small variation in the pixel brightness in the direction of the ridges. The ridge orientation information is obtained from the output of step 310 in FIG. 3.

More specifically, the following expression is used to quantify the feature "confidence," G, of a fingerprint image region at pixel:

$$G = (Var_o - Var_p)/\log(B),$$

where $Var_o$ and $Var_p$ are orthogonal and parallel variances at the pixel, B is the average brightness of a square block of the pixels centered around the given pixel. In a preferred embodiment, the size of the block is in the range of 12–20 pixels, more preferably 16 pixels. In a preferred embodiment, the number of samples needed to compute $Var_o$ and $Var_p$ is roughly equal to the number of pixels equivalent to twice the distance between two parallel ridges on a typical fingerprint (average inter-ridge distance, T_avg). In a more preferred embodiment, the number of samples is chosen to be 16.

In a preferred embodiment, feature confidence is computed only once per block at the block center pixel and the feature confidence at any other pixel in the block is assumed to be identical to the feature confidence at the corresponding block.

Since the human skin is elastic, the image capture process might result in different distortions of the finger skin with each different capture of fingerprint as it is placed on the fingerprint capture station. This results in an identical pair of the features (say, minutiae) at different distances apart from each other in the different prints of the same finger captured at different times. One way to avoid this problem is to measure the distances of the features on the fingerprint in the ridge count metric.

A ridge count between any two points on the fingerprint is defined as the number of ridges running between the two points on a fingerprint. Given two points in a fingerprint image, the proposed ridge count process 1300 (FIG. 8) determines the length of the line joining the points in terms of number of ridge distances, i.e., the number of times the lines crosses the ridges. Since the ridge count is invariant to the elastic distortions of the finger, it has a better chance of representing the true invariant distance between feature points on the finger.

The thinned fingerprint image resulting from thinning process in step 330 and the confidence image resulting from the foreground background segmentation step 315 of the feature extraction process comprise two primary components of data for determination of ridge count between any two points on a fingerprint. Any pixel in the fingerprint image could be classified-into three categories—either it is a ridge pixel, a valley pixel, or invalid pixel. A pixel is considered to be an invalid pixel if the feature confidence value, G, at that pixel n the image is: (1) below a threshold confidence value or (2) the pixel belongs to background portion of the fingerprint image. Otherwise, the pixel is considered to be a valid pixel. In a preferred embodiment, the threshold value of the confidence, TG, is set in the range of 0–7.8. In a more preferred embodiment, the threshold confidence value, TG, is set to 0.

If a pixel is valid and it belongs to a ridge pixel in the thinned image, it is considered to be ridge pixel. If a pixel is valid and it does not belong to a ridge pixel in the thinned image, it is considered to be valley pixel.

Figure 7A:
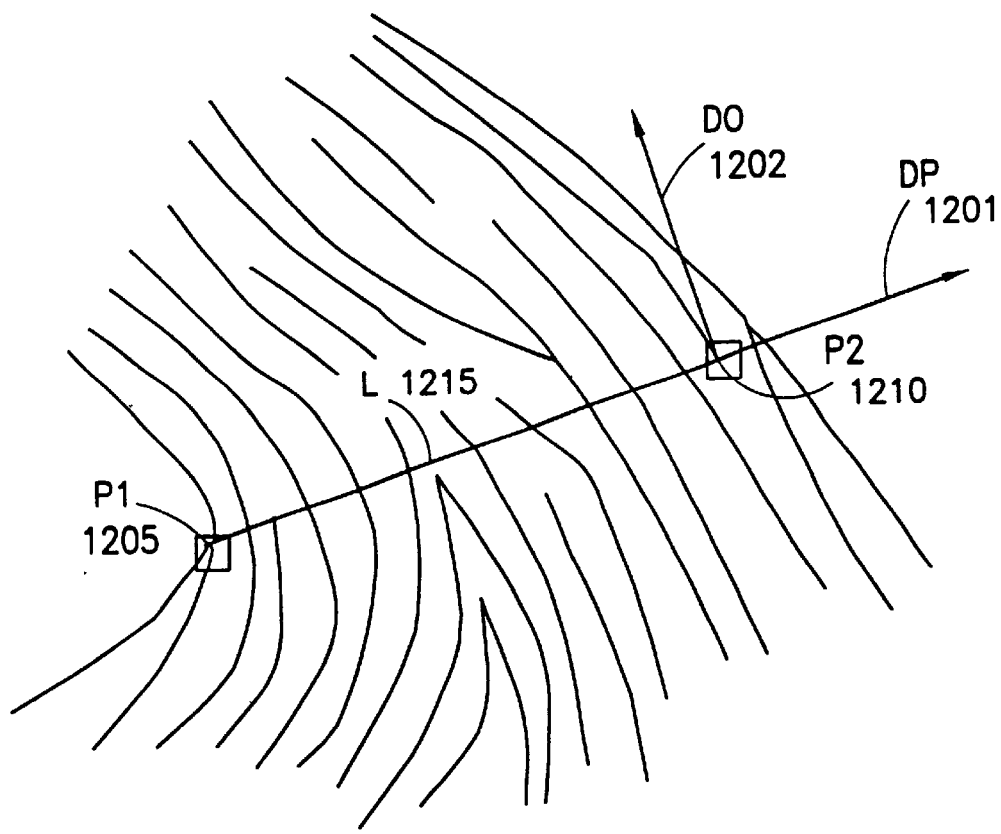
FIGS. 7A and 7B, is a diagram showing ridges being traversed (FIG. 7A) over a line or bar (FIG. 7B) between two features of a fingerprint.
Figure 7B:
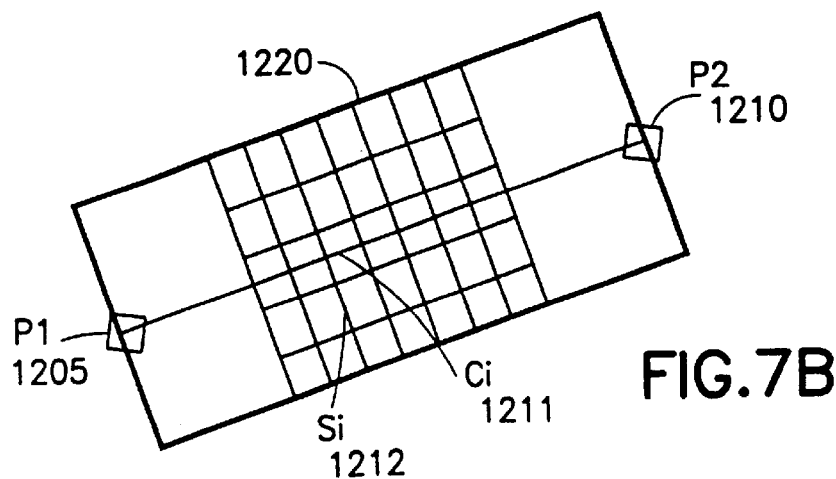
Figure 8:
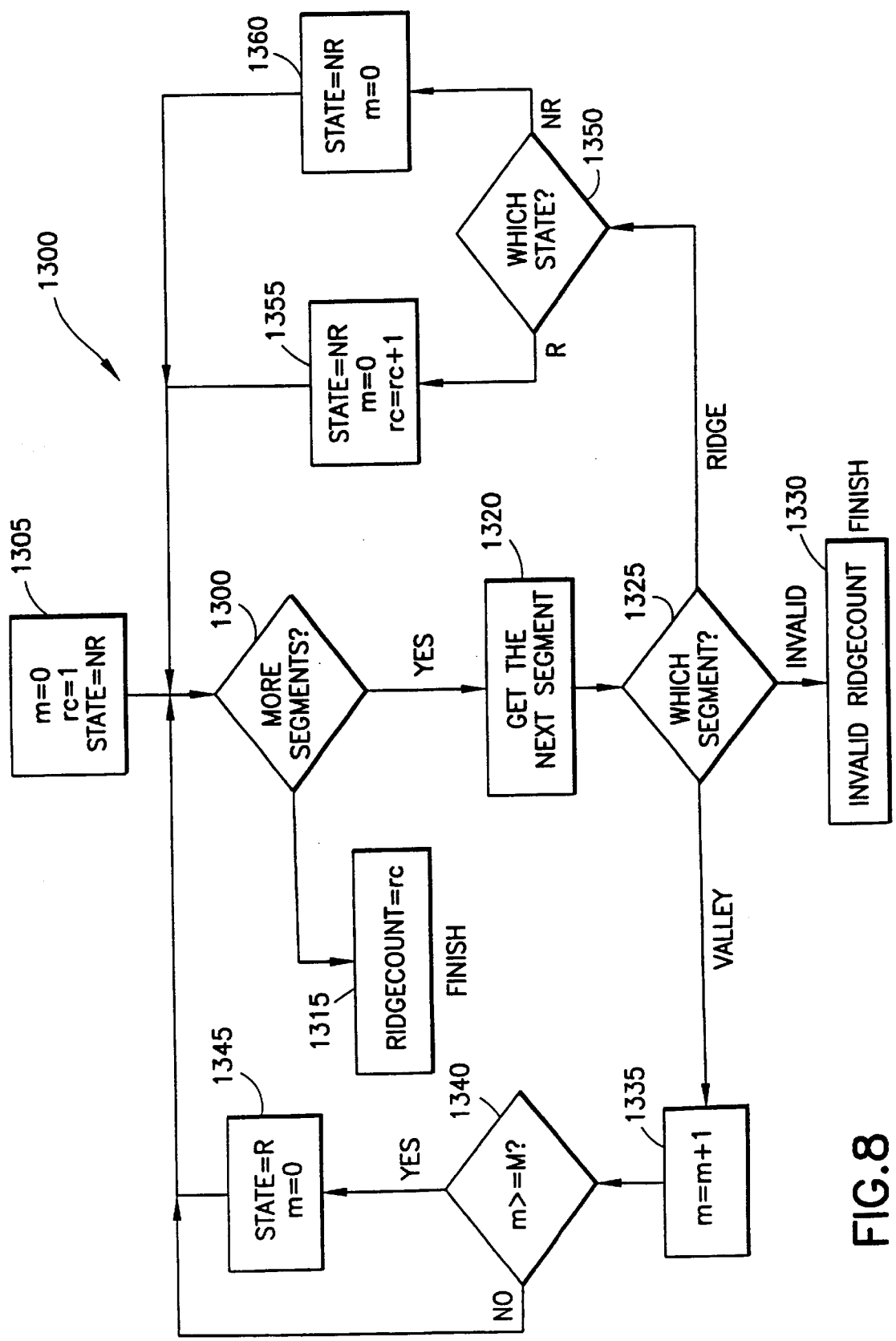
FIG. 8 is flow chart showing the steps of the ridge counting process.

Refer to FIG. 7 (comprising FIGS. 7A and 7B) and FIG. 8. These figures describe a ridge counting process that counts the number of ridges that are crossed when traversing a line between two points, e.g., minutiae. If the process encounters an invalid pixel during this traversal, the ridge count between the two points becomes invalid. Also, in a preferred embodiment, a bar, with an odd number of pixel width, is traversed in lieu of the line. Using the bar increases the probability of detecting ridge pixels and invalid pixels during the traversal and therefore makes the process 1300 (FIG. 8) more robust.

Given the two points, P1 and P2 (1205 and 1210, FIG. 7A) on the fingerprint for which the ridge count is to be computed, the process 1300 traverses the thinned fingerprint image (resulting from the thinning step 330 of the feature extraction 620) along a path, e.g., a line 1215 or a roughly rectangular bar 1220 (FIG. 7B) joining the two points. The bar is of pre-specified width of an odd number of pixels, e.g., Twbar=2W+1 pixels, and is roughly bilaterally symmetric with respect to the line joining the points P1 and P2. In a preferred embodiment, Twbar is in the range of 3 to 5 pixels, more preferably 3 pixels.

The traversal starts from one point P1 and proceeds in the direction DP 1201 along the line L 1215 (bar 1220, FIG. 7B) joining P1 and P2. Process 1300 determines a direction DO 1202 orthogonal to line joining P1 and P2. The traversal of the path (line 1215 or rectangular bar 1220) of pixels could be conceptually decomposed in two components: (1) a selection of a segment center Ci and, (2) given a segment center Ci, selection of pixels in a segment, Si, corresponding to Ci. For example, starting with P1, the segment centers C1, C2, C3, . . . , Ci, . . . Cz are successively selected such that they form sequences of pixels constituting the entire path joining P1 and P2 in the monotonically decreasing order of their (geometric) distance from P2.

In a preferred embodiment, each pixel on the line L 1215 is a segment center Ci. When the path is a line 1215, these segment centers are also the segment, Si. However, when the path is a bar 1220, the segment, Si, for each segment center Ci, are the pixels on a line segment in the orthogonal direction, DO, that is centered on Ci and has a length of W on either side of Ci.

More specifically, given a segment center Ci along the path, the process 1300 selects segment Twbar=2W+1 pixels along DO centered around P1, W pixels on each side of Ci. The process 1300 then proceeds to selecting next segment center C(i+1) and selection of the segment S(i+1) corresponding to segment center C(i+1). The selection of segment centers and segments alternate and results in segment by segment traversal of all pixels comprising the rectangular bar of pixels 1220. When the path is a line, W=0.

If none of the Twbar pixels of segment Si are ridge pixels, the segment Si is considered to be valley segment. If any of the pixels comprising segment Si is a ridge pixel, the segment is considered to be ridge segment.

A segment Si is considered to be invalid segment if any of the pixels comprising that segment is considered to be invalid.

While traversing the rectangular bar of pixels 1220 from point P1 1205 to P2 1210, if the process 1300 encounters any invalid segments, the ridge count between P1 1205 and P2,1210 is considered to be invalid.

While traversing the rectangular bar of pixels 1220 from point P1 1205 to P2 1210, the process 1300 is always in one of the two states: receptive or non-receptive. Initially, the process 1300 is in the non-receptive state. The process 1300 enters into the receptive state only if it encounters M number of successive valley segments during its traversal. This insures that the valley is at least M segments (pixels) wide and avoids counting small distances between spurious ridge pixels as a valley. Encountering a ridge segment at any time brings the process 1300 into the non-receptive state, i.e., this reinitializes the process 1300. In a preferred embodiment, the parameter M is between 2–4, more preferably 3.

The ridge count between two points P1 1205 and P2 1210 on a fingerprint is a number. This number is the number of transitions from the receptive to non-receptive state undergone by the process 1300 while traversing the rectangular bar 1220. As stated before, the ridge count between any two points is considered invalid if the process 1300 encounters an invalid segment and this holds true irrespective of the number of transitions from the receptive to the non-receptive state.

In some embodiments, the computation of the confidence attribute, G, might be avoided (to improve speed). In such system realizations, the foreground (background) pixels of the fingerprint as obtained in foreground/background segmentation in step 315 are considered as valid (invalid) pixels.

In some embodiments, the ridge count for every pair of points on the fingerprint is computed and used for matching fingerprints 640. In a preferred embodiment, the ridge counts are not computed for every pair of points but for only between minutiae pair locations. This increases speed of the process 1300.

All pixel measures in the document presuppose the fingerprint image resolution of 512 dots per inch. The measures need to be appropriately scaled if the resolution of the given fingerprint is not 512 dots per inch. The techniques of scaling are apparent to those skilled in the art.

FIG. 8 is flow chart showing the steps of the ridge counting process 1300. The process starts 1305 with a segment counter, m, initialized to 0, a ridge count, rc, initialized to 1, and the state initialized to "non-receptive." In step 1310, the process determines if there are more segments, Si 1211, on the line 1215. If there are not, the process 1300 finishes 1315 and returns the value of the ridge count, rc. If there are more segments, the process selects 1320 the pixels belonging to the next segment, Si 1212. The process 1300 then determines 1325 if the segment is a valley segment, a ridge segment, or an invalid segment, as defined above. If the segment is invalid, the process 1300 returns a flag indicating that the ridge count is invalid and the process ends 1330. If the segment is a valley, the value m is incremented 1335 and then checked 1340 to determine if m is greater than or equal to M. If not, the process returns to step 1310. If it is, the state of the process is set 1345 to "receptive" and the segment counter,m, is set 1345 to 0. However, is the segment is a ridge segment 1325, the state of the process 1300 is checked 1350. If the state is receptive, the state is reset to "non-receptive", the segment counter, m, is reset to 0, and the ridge count, rc, is incremented 1355. The process 1300 then returns to step 1310. If the state is "non-receptive" 1350, the segment counter, m, is reset to 0 and the state is reset to "non-receptive" 1360. The process 1300 then returns to step 1310.

The various thresholds used in this process 1300 could be predetermined based on the statistical properties of the image population or could be adaptively determined for each image based upon any image properties (for instance, the signal to noise ratio) of that particular image. The thresholds could also be adaptively augmented to include the image quality, image intensity, and image brightness factor. The magnitude of the various thresholds recommended in this document were order of magnitude estimates. But the actual threshold could be more liberal or conservative depending upon the application context.

In a preferred embodiment, the feature matching step 640 is performed by a process that is disclosed in U.S. patent application Ser. No. 08/764,949, entitled "Method and Apparatus for Fingerprint Matching using Transformation Parameter Clustering Based on Local Feature Correspondences", to Califano et al., filed on the same day as this application and that is herein incorporated by reference in its entirety.

Given this disclosure alternative equivalent embodiments will become apparent to those skilled in the art. These embodiments are also within the contemplation of the inventors.

We claim:

1. A method for determining a distance between features of a fingerprint, comprising the steps of:
   a. determining a path between the features;
   b. segmenting the path into one or more segments, each segment having a center;
   c. selecting a segment;
   d. determining if the segment is any one of the following: a valley segment and a ridge segment;
   e. if the segment is a valley segment, determining a width of the valley; and
   f. if the segment is a ridge segment, incrementing the distance only if the determined width of the valley is greater than a minimum width.

2. A method for determining a ridge count between two minutiae in an image of a fingerprint, comprising the steps of:
   segmenting a path between the two minutiae into segments, each segment having a center, where the path has a width a N pixels, where N is greater than two, and where each segment is comprised of the N pixels that are disposed on a line that crosses the path;
   for each segment in turn, determining if at least one of the N pixels that comprise the segment indicate the presence of a ridge;
   if the presence of a ridge is indicated, incrementing a ridge count only if the method is in a receptive state, and then placing the process into a nonreceptive state; and
   if the presence of a ridge is not indicated, assuming that the segment is a valley segment and, after M successive valley segments are indicated, placing the process into the receptive state.

3. A method as in claim 2, wherein M has a value in the range of about two to about four.

4. A method as in claim 2, wherein N has a value in the range of about three to about five.

5. A method as in claim 2, wherein N and M are both equal to three.

6. A method as in claim 2, and further comprising a step of terminating the counting of ridges between the two minutiae if a segment is found to contain an invalid pixel.

7. A method as in claim 2, wherein the segment centers between two successive segments are located one pixel apart.

* * * * *